Figure 3:
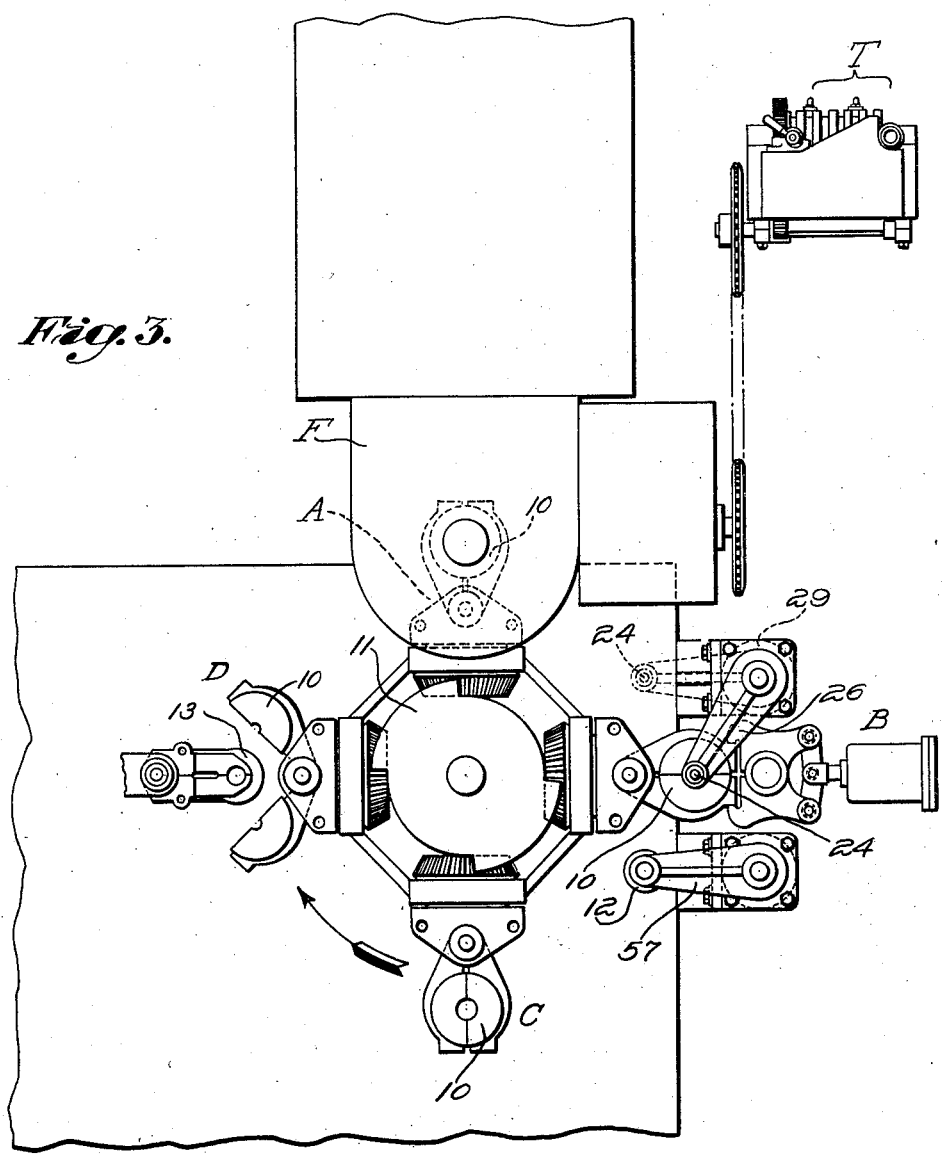

July 14, 1936.  G. E. HOWARD  2,047,507
GLASSWORKING APPARATUS AND METHOD OF FORMING GLASSWARE
Original Filed July 27, 1934   2 Sheets-Sheet 1
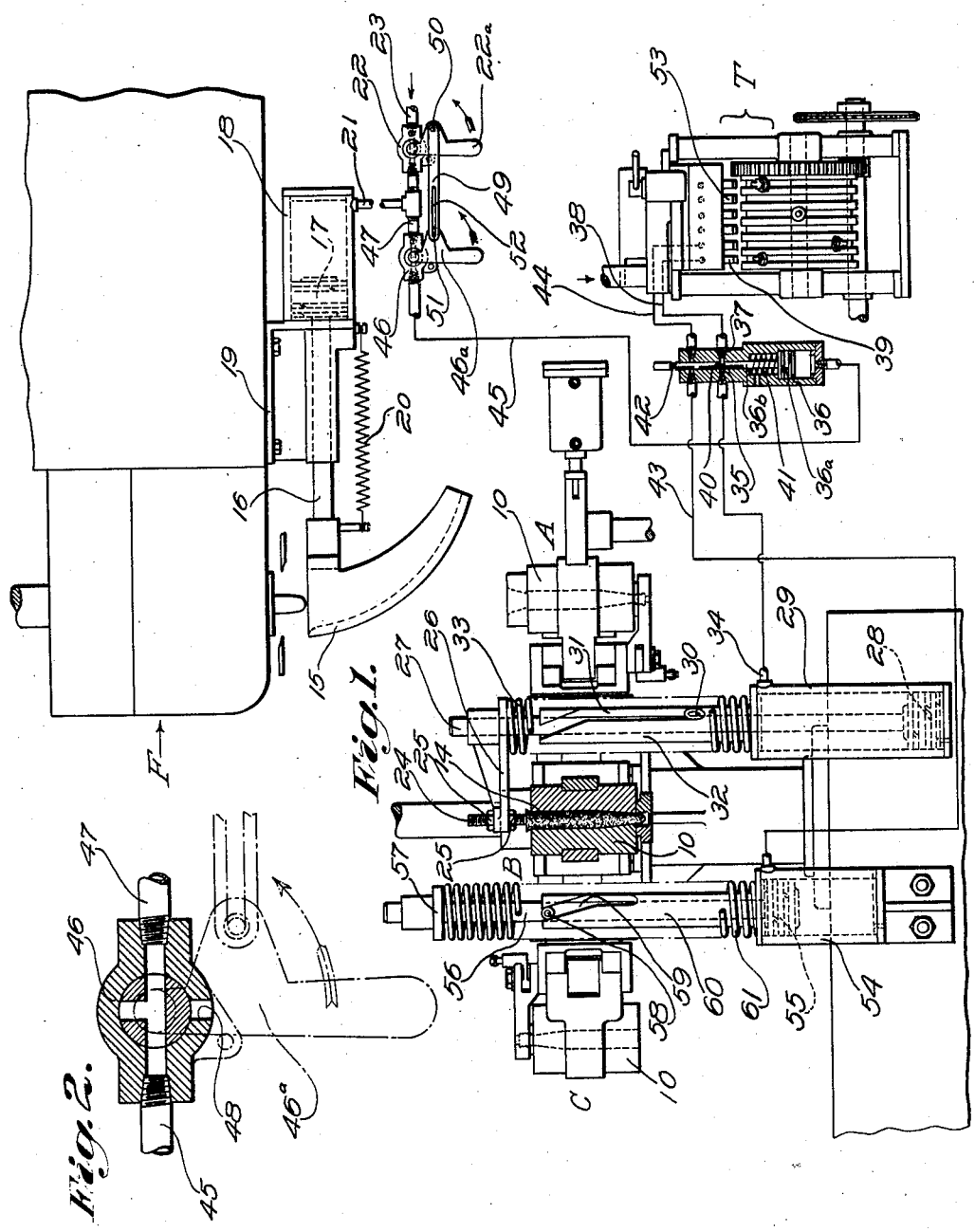

July 14, 1936. G. E. HOWARD 2,047,507
GLASSWORKING APPARATUS AND METHOD OF FORMING GLASSWARE
Original Filed July 27, 1934 2 Sheets-Sheet 2

Witness;
W. B. Thayer.

Inventor;
George E. Howard
by Brown & Parham
Attorneys

Patented July 14, 1936

2,047,507

UNITED STATES PATENT OFFICE 2,047,507

GLASSWORKING APPARATUS AND METHOD OF FORMING GLASSWARE

George E. Howard, Butler, Pa., assignor to Hartford-Empire Company, Hartford, Conn., a corporation of Delaware Application July 27, 1934, Serial No. 737,248
Renewed December 2, 1935

11 Claims. (Cl. 49—5)

This invention relates generally to the manufacture of articles of glassware, such as bottles, by the use of automatic glass working apparatus of the type that comprises a glass feeder for automatically producing mold charges at timed intervals and a glassware forming machine having its operations synchronized with the operations of the feeder and having a mold or molds which are moved intermittently in a closed path and are stationed temporarily at each of a plurality of different places along such path, one of such stations being that at which the charges produced by the feeder normally are delivered to the mold or molds.

It is advantageous, as disclosed in my co-pending application, Serial No. 716,634, filed March 21, 1934, for Method of and apparatus for forming glassware, that each of the charge receiving molds of a glassware forming machine of apparatus of the general type above referred to shall be active or involved in the performance of some step in the manufacture of a bottle or other article of glassware at each of the several stations at which that mold is disposed during a complete cycle of movements thereof. By this arrangement, the charge receiving molds are utilized to maximum efficiency.

A difficulty with the arrangement and mode of operation just described is that no adequate opportunity may be afforded for inspection, and/or swabbing of the walls of the cavity of each charge receiving mold when that mold is at any of the several stations referred to, as also may be desirable frequently. An object of the present invention is to obviate this difficulty.

A more specific object of the invention is to provide glass working apparatus comprising a feeder and an associate intermittent glassware forming machine and a method of forming glassware by the use of such apparatus in which provision is made for temporarily diverting the charges produced by the feeder from the molds of the forming machine and for temporarily holding out of operation a working part of the forming machine that normally would obstruct the cavity of each of such molds when that mold is at a particular station, thereby affording an opportunity for inspecting and/or swabbing the cavity of the mold while at that station without interrupting the general operating movements of the associate feeder and forming machine and without disturbing the synchronized or timed relationship of such operations.

Another object of the invention is to provide an efficient and reliable device that will function when rendered operative by manual actuation to swab the cavity of each mold that is presented at a particular station without interfering with the operation of the means whereby molds are moved to and from that station.

A further object of the invention is to provide a reliable and efficient means for swabbing the cavity of a mold of an intermittent glassware forming machine while that mold is disposed at a particular station, such means being adapted to be operated as a result of manual actuation but being incapable of operation independently of associate means for diverting from the molds of the forming machine charges that normally would be delivered thereto and for holding in an inactive out-of-the-way position a baffle plate that normally would obstruct the cavity of the mold at the station at which the swabbing is to be effected.

Other objects and advantages of the invention will hereinafter be pointed out or will become apparent from the following description of a practical embodiment of the invention as shown in the accompanying drawings, in which:

Figure 1 is a fragmentary view, partly in side elevation and partly in vertical section and largely diagrammatic, showing mold swabbing mechanism embodying structural features of the invention applied to organized glass working apparatus of the type hereinbefore described, only such parts of the glass working apparatus being shown as are believed to be necessary or desirable to afford an understanding of the invention;

Fig. 2 is a detail sectional view of a valve that is included in the mechanism shown in Fig. 1; and Fig. 3 is a plan view of the structure shown in Fig. 1.

The glassware forming machine that is shown in part in the accompanying drawings has four charge receiving molds 10, each of which is disposed at each of the stations A, B, C and D, Fig. 3, in turn during each cycle of rotation of the table or carrier 11 on which these molds are supported.

At the station A, each mold 10 is in inverted position and normally receives a charge from the associate feeder F, the outlet of which may be disposed directly above the cavity of the mold when the mold is at the station A. The glass in the mold may be settled or compacted therein at that station by the use of suitable well known means (not shown).

At the station B, a glass forming operation normally takes place, such operation involving the automatic positioning of a baffle plate 12 on top of the inverted mold and the introduction of blowing air to the glass in the mold to counterblow such glass against the walls of the mold cavity and the baffle plate.

At the station C, the counterblown glass or parison may be retained in the closed mold and permitted to reheat or further counterblowing of the glass in the mold may be effected at that station, if desired.

At the station D, the glass parison is transferred to a blow mold 13 on a cooperative finishing mold carrier or table.

With an arrangement and a mode of operation substantially as above described, an adequate opportunity may not be afforded during normal glass forming operations for inspecting and/or swabbing the cavities of the molds 10 at any of the various stations at which each of such molds is disposed during a cycle of operations of the forming machine. In order to permit such mode of operation, which provides for increased efficiency of general operation and particularly of utilization of the charge receiving molds, and at the same time to provide for inspection and swabbing of the molds, when desired, the present invention contemplates the provision of suitable normally inactive means adapted to be rendered effective to divert to cullet the charges produced by the feeder F when a mold swabbing operation is to be effected and for then retaining the baffle plate 12 in its inactive out-of-the-way position (shown in Fig. 3) and simultaneously rendering operative a device for moving a swab from an inactive out-of-the-way position, indicated by the position of a swab-supporting stem 24, as shown in dotted lines in Fig. 3, downwardly into the cavity of the mold at the station B, as to the position best seen in Fig. 1. Each of the molds 10 may be treated in this manner in its turn while it is disposed at the station B, the device for effecting the working stroke of the swab 14 to the position shown in Fig. 1 also being effective to withdraw the swab so as to free the mold for movement from the station B at the regular time. The synchronized or suitable timed operating movements of the associated feeder and forming machine are continued without being interrupted by the mold swabbing operations. Of course, no glassware is made while the mold charges are diverted to the cullet but this is only for the time required for one or all of the charge receiving molds 10 to be swabbed at the station B. It may be desirable to swab the molds frequently, as, for example, at intervals of thirty minutes.

The means for diverting the charges from the outlet of the feeder to cullet may comprise a chute 15, Fig. 1, carried by the rod 16 of a piston 17 that is reciprocable in a cylinder 18. The cylinder 18 may be supported by a bracket 19 attached to the frame work of the feeder, or in any other suitable manner, so that the chute 15 will be disposed in position to direct the charges produced by the feeder to cullet when the piston 17 is at the forward or outer end of its stroke, as shown in Fig. 1. When the piston 17 is at the opposite or rearward end of its stroke, the chute 15 will be disposed in an inactive out-of-the way position laterally of the outlet of the feeder so as not to interfere with the delivery of the charges to the molds of the associate forming machine.

A spring 20 tends to retain the chute 15 in its inactive out-of-the-way position and the piston 17 at the outer or rearward end of the cylinder 18. Movement of the chute to its active or projected position against the action of the spring 20 may be effected by air or fluid under pressure, applied to the rearward or outer end of the cylinder 18 by a delivery pipe 21.

A valve 22 has its delivery end connected with the pipe 21 while its intake end is connected with a pipe 23 which in turn may be connected with any suitable source of supply of air under pressure. When the valve 22 is opened, as when the handle 22a thereof is in the position shown in Fig. 1, the chute 15 will be retained in its projected active position as shown and the charges that are produced by the feeder will be diverted to cullet.

The swab 14 is adjustably secured, as by the threaded stem 24 and the nuts 25, Fig. 1, to a lateral arm 26 on a vertical rod 27 that is disposed adjacent to the station B. The rod 27 may be an extension of the rod of a piston 28 that is reciprocable vertically in a vertical cylinder 29. A projecting pin 30 on the rod 27 works in a groove or slot 31 in a stationary tubular guide 32 that surrounds the rod 27 so as to swing the arm 26 and the swab 14 laterally between their dotted line inactive positions, Fig. 3, to their full line active positions as shown in the same view during the vertical movements of the swab.

A spring 33 that encircles the rod 27 and the stationary guide 32 reacts against both the arm 26 and an underneath support, such as the top of the cylinder 29, so as to tend to maintain the swab in its raised inactive out-of-the-way position. When air under pressure is admitted to the upper end of the cylinder 29 through an air line 34, the swab is moved laterally and downwardly to its active position, shown in Fig. 1, in the cavity of the mold at the station B.

The air line 34 is connected to an outlet port 35 of a valve 36. An inlet port 37 of the valve 36 is opposite the bore 35 and is connected by an air line 38 with a valve 39 of a suitable valve controlling timer mechanism T, such as the well known Hartford I. S. timer, an example of which is shown more or less diagrammatically in the drawings. Such timer may be employed in any suitable known manner to control the operations of the associated feeder and glassware forming machine.

The valve 36 includes a piston 36a reciprocable in a cylindrical portion of the valve and carrying a stem 36b provided with a transverse passage 40 for effecting communication between the air lines 38 and 34 when the piston valve 36a is in its raised position, as shown in Fig. 1. A spring 41 tends to maintain the piston valve 36a in its lowermost position, at which time the stem 36b of the valve cuts off communication between the line 38 and the line 34 and opens communication, as by means of the groove 42 thereon, between oppositely disposed air lines 43 and 44 for a purpose which will be presently pointed out.

The piston 36a of the valve 36 is raised, to the position shown at Fig. 1, by air applied to its lower end from an air line 45. The line 45 leads to the valve 36 from a valve 46, the intake end of which is connected by a pipe 47 with the delivery pipe 21 of the valve 22.

The valve 46 is shown in detail in Fig. 2. It is obvious from that view that when the handle 46a of that valve is in the position shown in Figs. 1 and 2, the core of the valve will be turned so as to provide communicaton between the air lines 47 and 45. However, when the handle 46a has been turned to the right in the direction of the arrows in Figs. 1 and 2, through approximately 90°, communication between the lines 47 and 45 will be interrupted and air from the line 45 will be permitted to exhaust through the vent 48.

The structure of the valve 22 is identical with that of the valve 46 and the handles 46a and 22a are connected by a link 49, one end of which is connected by a pivot pin 50 with the handle 22a while its opposite end is pivotally and slidably connected with the handle 46a, as by the pivot pin 51 and the slotted portion 52 of the link. With this arrangement, manipulation of the handle 22a to the right, or in the direction of the arrow, will effect a corresponding movement of the handle 46a so that both valves 22 and 46 will be closed simultaneously. On the other hand, after both valves have been closed, the valve 22 may be opened independently of the valve 46 by manipulation of the handle 22a and the valve 46 subsequently opened when its handle is moved to the position shown in Figs. 1 and 2.

The line 44 leads to a valve 53 of the aforesaid timer structure T. The air line 43 leads to the upper end of a cylinder 54 in which is disposed a piston 55 for operating a vertical rod 56. The rod 56 carries a lateral arm 57, Fig. 3, the outer end portion of which supports the aforesaid baffle plate 12. A pin 58 on the rod 56 works in a slot or groove 59 in a vertical tubular guide 60 that surrounds the rod 56 so as to move the baffle 12 from its inactive out-of-the-way position, shown by full lines in Fig. 3, to an active position (not shown) on a mold at the station B when the piston 55 is moved from its raised position to the lower end of its stroke in the cylinder 54. A spring 61 tends to retain the piston 55 at the upper end of the cylinder 54 and thus to keep the baffle plate 13 in its out-of-the-way inactive position. When air is supplied to the upper end of the cylinder 54 from the line 43, the piston 55 will be forced downwardly in the cylinder 54 so as to move the baffle head to its active position on a mold at the station B.

From the foregoing description of mechanism for carrying out the invention, the operation thereof will be readily understood. During normal glassware forming cycles of operation of the forming machine, which includes the intermittently rotated carrier 11 and the molds 10, the swab 14 will be retained in its raised inactive out-of-the-way position. Mold charges as produced by the feeder will be delivered to the molds at the station A and the baffle plate 13 will be moved downwardly and laterally from its raised inactive position to its active position on a mold at the station B as each charged mold is brought to that station. During this time, the chute 15 is retained in its inactive out-of-the-way position.

At intervals of selected frequency, which may vary according to particular service requirements or preference, the handle 22a of the valve 22 is manipulated so as to be swung from its raised position to the position shown in Fig. 1. This will open the valve 22 independently of the valve 46 and will cause the chute 15 to be projected from its inactive position to its charge directing active position.

The handle 46a of the valve 46 then will be swung from its raised position to the position shown in Fig. 1 and this will effect actuation of the valve 36 so as to interrupt communication from the valve 53 of the timer T to the cylinder 54 while at the same time establishing communication from the valve 39 of the timer T to the cylinder 29 of the mechanism for operating the swab 14. The valve 22 preferably is opened in advance of the valve 46 so as to assure that an uncharged mold will be disposed at the station B at the time the swab 14 is moved downwardly into the cavity of that mold.

So long as the valves 22 and 46 remain open, the swab 14 will be moved downwardly into each mold as it is presented at the station B and will be raised in time to permit that mold to be moved to the succeeding station by the succeeding rotary movement of the carrier 11. This condition may be maintained until each of the molds on the carrier 11 has been presented at the station B without any glass therein and has been swabbed by the member 14. This will mean diversion to cullet of charges for as many articles of glassware as there are molds on the carrier 11 each time such molds are swabbed but will not interrupt the operations of the feeder or the timed relationship existing between the operations of the feeder and the associate forming machine. When all the molds have been swabbed, the handle 22a will be swung to the right from the position shown in Fig. 1 thereby closing both the valve 22 and the valve 46. As a result of this operation, the chute 15 will be moved to its out-of-the-way position and the valve 36 will be operated so as to restore communication between the valve 53 of the timer T and the mechanism for operating the baffle plate 13 and to interrupt communication between the valve 39 of the timer T and the mechanism for operating the swab. Of course, the valves 22 and 46 may be closed when any number of molds less than the total number on the carrier 11 have been swabbed, if the remaining molds do not require swabbing at that time.

While the invention has been described as applied to glass working machinery of which the molds are active at all stations at which they are halted in turn, it is obvious that the improved mechanism for swabbing the cavities of the molds may be used to advantage in any other type of intermittent glassware forming machine. Also, the term "swabbing" is to be understood as having a meaning broad enough to include the application to the mold cavity of any suitable fluid or substance, whether by the direct contact of an applicator with the mold cavity, as by inserting a swab thereinto, or by spraying or otherwise projecting a fluid or suitable substance against the walls of the mold cavity. Also, the swabbing mechanism may be located at any other of the stations at which the molds are presented in turn during the ordinary rotary movements of the carrier for the molds and mechanism such as hereinbefore described may be provided to hold in an inactive out-of-the-way position any other moving part of the forming machine which, in its active position, would obstruct the cavity of the mold at that station or interfere with the swabbing of the mold cavity. Various modifications and changes of structure may be resorted to without departing from the spirit and scope of the invention.

I claim:

1. The combination with a glassware forming machine having a plurality of molds and an intermittently movable carrier for moving each of said molds to and from each of a plurality of stations in turn, and a feeder for automatically producing charges of glass for delivery to said molds at one of said stations, of normally inactive mechanism adapted when rendered operative to interrupt the delivery of the charges produced by the feeder to the molds at said charge delivery station without interrupting the charge producing operations of the feeder and to swab the cavity of each mold when it is disposed at another of said stations without interrupting the movements of the carrier for moving said molds.

2. The combination with glass working apparatus, comprising a glassware forming machine having a plurality of molds and an intermittently operated carrier for moving said molds in turn to and from said stations in turn, each of said molds being adapted to be active in the performance of a step in the manufacture of an article of glassware at each of said stations, and a feeder for automatically producing mold charges of molten glass for delivery to said molds at one of said stations, of normally inactive means adapted to be actuated manually to divert the charges produced by said feeder from the molds at the charge delivery station, and other normally inactive means adapted to be rendered operative only when said charges are being diverted from said molds for swabbing the cavity of each of said molds when it is disposed at another of said stations without interfering with the movements of the molds to and from said stations.

3. The combination with glass working apparatus, comprising a glassware forming machine having a plurality of molds and an intermittently operated carrier for moving said molds in turn to and from said stations in turn, each of said molds being adapted to be active in the performance of a step in the manufacture of an article of glassware at each of said stations, and a feeder for automatically producing mold charges of molten glass for delivery to said molds at one of said stations, of normally inactive means adapted to be actuated manually to divert the charges produced by said feeder from the molds at the charge delivery station, other normally inactive means adapted to be rendered operative only when said charges are being diverted from said molds for swabbing the cavity of each of said molds when it is disposed at another of said stations without interfering with the movements of the molds to and from said stations, and means for rendering both of said means inactive simultaneously.

4. The combination with glass working apparatus, comprising a plurality of molds, an intermittently operated carrier for moving said molds in turn to and from each of a plurality of stations, a feeder for automatically producing charges of molten glass for delivery to said molds at one of said stations, a baffle plate movable from an inactive out-of-the-way position to an active position over the cavity of each mold when that mold is disposed at another of said stations, of normally inactive means adapted when rendered operative to divert the charges produced by said feeder from the molds at said mold charge delivery station, to retain in its inactive out-of-the-way position said baffle plate, and to swab the cavity of each mold when it is disposed at the station at which said baffle plate normally is disposed over the mold at that station, all without interrupting the production of charges by the feeder or the operations of the carrier by which said molds are moved to and from said stations.

5. The combination with glass working apparatus, comprising a glassware forming machine having a plurality of molds, an intermittently operated carrier for moving said molds in turn to and from each of a plurality of stations, a feeder for automatically producing charges for delivery to said molds at one of said stations, a baffle plate normally moved from an inactive out-of-the-way position to a position to cooperate with each mold when that mold is disposed at another of said stations, of a movable chute normally disposed in an inactive position of the path of delivery of the charges produced by said feeder, means for moving said chute to a position to receive the charges produced by said feeder and to direct said charges away from the station at which charges normally are delivered to the molds of said forming machine, a swab mounted for movement from an inactive out-of-the-way position into the cavity of each mold when that mold is at the station at which said baffle plate normally cooperates therewith, and means operable when said chute is in its charge receiving position for operating said swab and for maintaining said baffle plate in its inactive out-of-the-way position.

6. The combination with glass working apparatus, comprising a plurality of molds, an intermittently operated carrier for moving said molds in turn to and from each of a plurality of stations, a feeder for automatically producing mold charges of molten glass for delivery to the molds of the forming machine at one of said stations, and a baffle plate normally moved periodically from an inactive out-of-the-way position adjacent to another of said stations to a position to cooperate with each mold when that mold is disposed at said last named station, of means for swabbing the cavities of said molds when desired, said means comprising a swab mounted for movement from an inactive out-of-the-way position adjacent to said last named station to position to apply a desired substance to the cavity of the mold at that station, a chute movable from an inactive out-of-the-way position to a position to receive the charges produced by said feeder and to divert such charges from the molds at the charge delivery station, pneumatic means for operating said chute, a valve for controlling said pneumatic means, other pneumatic means for operating said swab and said baffle plate, and a second valve operative only in conjunction with said first named valve for rendering operative said second named pneumatic means to retain said baffle plate in its inactive out-of-the-way position and to move said swab periodically between its inactive position and its mold swabbing position in timed relation with the movements of said molds to and from the station at which they are engaged by said swab.

7. The combination with glass working apparatus, comprising a plurality of molds, a periodically operated carrier for moving said molds in turn to and from each of a plurality of stations, a feeder for automatically producing mold charges for delivery to said molds when they are disposed at one of said stations, a baffle plate movable periodically between an inactive out-of-the-way position adjacent to another of said stations and a position to cooperate with said mold when that mold is disposed at said last named station, of a swab mounted for movement from an inactive out-of-the-way position adjacent to said last named station to a position to enter the cavity of each mold when that mold is disposed at said station, coordinated pneumatic mechanisms for retaining said baffle plate in its inactive position and for moving said swab periodically between its said positions so as to swab said molds at said last named station without interrupting the movements of said molds to and from that station, a valve for rendering said co-ordinated pneumatic mechanisms operative, a chute movable from an inactive out-of-the-way position to a position to receive the charges produced by said feeder and to direct said charges to cullet, pneumatic means for operating said chute, and a valve for rendering said last named pneumatic means operative, said second named valve being adapted to be actuated to render the pneumatic mechanism that it controls operative independently of actuation of said first named valve and said first named valve being adapted to be actuated to render the pneumatic mechanisms that it controls operative only after a corresponding actuation of said second named valve.

8. The combination with a glassware forming machine, comprising a plurality of molds and an intermittently operated carrier for moving said molds in turn to and from each of a plurality of stations, at one of which said molds are adapted to receive charges from an associate feeder, of a movably mounted swab normally disposed in an inactive out-of-the-way position adjacent to another of said stations and adapted to be moved from its out-of-the-way position to a position to swab the cavity of each mold that is disposed at said last named station, and normally inactive means adapted when rendered operative to operate said swab in timed relation with the movements of the molds to and from said last named station so as to swab each mold at that station and to remove the swab from the mold in time to permit the regular movement of the mold from that station.

9. In the manufacture of articles of glassware by the use of a feeder that automatically produces charges of molten glass and an intermittently operated associate forming machine having molds moved in turn to and from each of a plurality of stations, at one of which said molds normally receive the charges produced by the feeder, the method which comprises continuing the charge producing operations of said feeder and the movements of the molds to and from said stations while temporarily diverting from the molds the charges produced by the feeder, and swabbing the cavities of the respective molds in turn at one of said stations while said charges are being diverted from the molds.

10. In the manufacture of articles of glassware by the use of a feeder that automatically produces charges of molten glass and an intermittently operated associate forming machine having molds moved in turn to and from each of a plurality of stations, at one of which said molds normally receive the charges produced by the feeder, the method which comprises continuing the charge producing operations of said feeder and the movements of the molds to and from said stations while temporarily diverting from the molds the charges produced by the feeder, swabbing the cavities of the respective molds in turn while the charges are being thus diverted and while each mold is disposed at one of said stations, and temporarily retaining in an out-of-the-way inactive position an operating part of said forming machine that normally would obstruct the cavity of each mold when said mold is at the station at which it is to be swabbed.

11. The method of manufacturing glassware which comprises continuously producing successive charges of molten glass, delivering the charges produced during a predetermined period of time to intermittently moved molds as said molds are presented at a particular station, forming the charges thus delivered to the molds into articles of glassware by steps involving activity of each of said molds at each of the stations to which it is moved in completing a cycle of movements beginning with its movement from the station at which it received a charge, temporarily interrupting delivery of charges to said molds at the expiration of said predetermined period of time without interrupting the regular production of charges and without interrupting the intermittent movements of the molds to and from the stations at which they normally are active, swabbing said molds at one of said stations during the period of interruption of delivery of charges to said molds, and repeating said series of operations.

GEORGE E. HOWARD.